United States Patent Office.

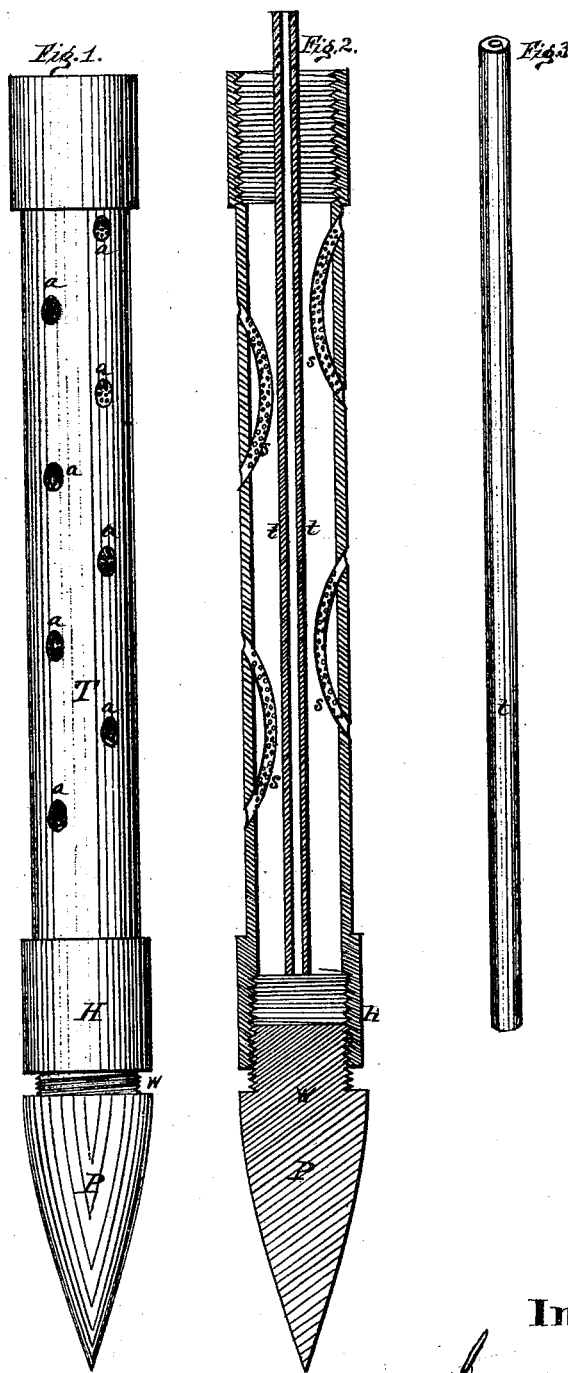

JAMES T. SHATTUCK, OF NATICK, MASSACHUSETTS.

Letters Patent No. 98,429, dated December 28, 1869; antedated November 27, 1869.

IMPROVEMENT IN WELL-TUBES.

The Schedule referred to in these Letters Patent and making part of the same.

I, JAMES T. SHATTUCK, of Natick, in the county of Middlesex, and State of Massachusetts, have invented certain Improvements in Well-Tubes, of which the following is a specification.

My invention relates to that class of well-tubes which is driven into the earth a sufficient depth to reach water, and which is furnished with small cylindrical perforated tubes inserted within the main tube or strainer.

The object of my invention is to overcome the difficulties experienced in the use of those well-tubes that are furnished with the small perforated tubes passing entirely through the main tube from side to side.

It is found that in forcing such tubes into the earth, the small cross-tubes are liable to become choked up with earth and small stones, and often burst from the pressure of such material.

These small cross-tubes also prevent the introduction of a clearing-tube from the top, for the purpose of forcing in water to clear out the dirt.

Referring to the drawing accompanying this specification—

Figure 1 is an outside view of the lower section of my well-tube;

Figure 2 is a longitudinal section of the same; and

Figure 3, a separate view of the clearing-tube.

The small perforated strainer-tubes $s$ $s$ are inserted in the sides of the main driving-tube T, elliptically, instead of passing through from side to side, and are so arranged that the openings $a$ $a$ alternate, and do not come opposite each other, which would weaken the main tube.

This arrangement of the small strainer-tubes allows the introduction of the clearing-tube $t$ $t$, to which a force-pump may be attached.

In forcing down the main tube T, the lower end will become more or less filled with dirt, which may be removed by forcing in water through the clearing-tube $t$ $t$. The dirt is thus stirred up, and can be pumped out at the top of the tube. The strainer-tubes $s$ $s$ being elliptical, are also easily cleaned out.

To the lower end of the main tube, I attach the solid point P, by the screw $w$, making said point and the coupling H larger than the main tube T, so that in driving down, a space is left around the main tube for the water to settle.

I claim, as my invention—

1. The elliptical perforated tubes $s$ $s$, in combination with the main driving-tube T, substantially as described.

2. The arrangement and combination of the main tube T, small tubes $s$ $s$, and clearing-tube $t$ $t$, substantially as and for the purposes hereinbefore set forth.

JAMES T. SHATTUCK.

Witnesses:
W. H. WRIGHT,
GEO. L. KEACH.